(12) United States Patent
Shiokawa

(10) Patent No.: US 8,189,529 B2
(45) Date of Patent: May 29, 2012

(54) MOBILE COMMUNICATION SYSTEM AND RADIO RESOURCES ASSIGNING METHOD FOR THE SYSTEM, AND BASE STATION

(75) Inventor: Masato Shiokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1168 days.

(21) Appl. No.: 11/979,691

(22) Filed: Nov. 7, 2007

(65) Prior Publication Data

US 2008/0159251 A1    Jul. 3, 2008

(30) Foreign Application Priority Data

Dec. 27, 2006    (JP) ................................. 2006-350805

(51) Int. Cl.
*H04W 4/00*    (2009.01)
(52) U.S. Cl. ..................... 370/330; 370/395.4; 370/431; 455/452.1
(58) Field of Classification Search .......... 370/229–235, 370/236, 236.1, 252, 253, 328–330, 395.21, 370/395.4, 431; 455/68, 69, 226.1, 226.2, 455/226.3, 226.4, 450, 451, 452.1, 452.2
See application file for complete search history.

(56) References Cited

U.S. PATENT DOCUMENTS

| 6,341,224 | B1 | 1/2002 | Dohi et al. |
| 6,400,699 | B1 * | 6/2002 | Airy et al. ...................... 370/329 |
| 2003/0126536 | A1 | 7/2003 | Gollamudi et al. |
| 2004/0248606 | A1 * | 12/2004 | Suzuki et al. .................. 455/522 |
| 2005/0271009 | A1 * | 12/2005 | Shirakabe et al. ............ 370/329 |
| 2006/0045195 | A1 * | 3/2006 | Ok et al. ........................ 375/260 |
| 2006/0094372 | A1 | 5/2006 | Ahn et al. |
| 2006/0121856 | A1 * | 6/2006 | Itoh et al. ......................... 455/69 |
| 2007/0026803 | A1 * | 2/2007 | Malm .......................... 455/63.1 |
| 2007/0232238 | A1 * | 10/2007 | Kawasaki ....................... 455/69 |

FOREIGN PATENT DOCUMENTS

| JP | 08-008802 A | 1/1996 |
| JP | 2002-345048 A | 11/2002 |
| JP | 2003-264490 A | 9/2003 |
| JP | 2004-312386 A | 11/2004 |
| JP | 2005-136773 | 5/2005 |
| JP | 2005-136773 A | 5/2005 |
| JP | 2006-50545 | 2/2006 |
| JP | 2006-237897 | 9/2006 |
| JP | 2006-237897 A | 9/2006 |
| JP | 2006-287758 | 10/2006 |

(Continued)

OTHER PUBLICATIONS

European Search Report dated Jan. 22, 2009.

(Continued)

*Primary Examiner* — Christopher Grey
(74) *Attorney, Agent, or Firm* — McGinn Intellectual Property Law Group, PLLC

(57) ABSTRACT

A mobile communication system including a base station which divides a transmission frequency band into a plurality of frequency blocks, and assigns radio resources to each mobile station for each of the frequency blocks, the base station including: a frequency block assignment information creation portion that creates frequency block assignment information based on a downlink signal reception status and a downlink signal reception status degradation rate in each mobile station; and a radio resource assignment portion that assigns the radio resources to each frequency block based on the frequency block assignment information.

15 Claims, 7 Drawing Sheets

FOREIGN PATENT DOCUMENTS

| | | |
|---|---|---|
| KR | 2006-0038131 | 5/2006 |
| WO | WO 2005/013525 A1 | 2/2005 |
| WO | WO 2005/020488 A1 | 3/2005 |
| WO | WO 2005/020489 A1 | 3/2005 |
| WO | WO 2006/104102 A1 | 10/2006 |

OTHER PUBLICATIONS

Korean Patent Office Action dated Jul. 23, 2009 and partial English translation thereof.

European Search Report dated Jun. 30, 2010.

"Wireless Communications", Andrea Goldsmith, paragraph 3.2.3, pp. 78-82, Cambridge University Press, 2005.

"Wireless Communications", Andreas Molisch, paragraph 5.7.1, pp. 85-87, John Wiley and Sons, 2005.

Japanese Office Action dated Sep. 13, 2011 with a partial English translation.

* cited by examiner

MOBILE COMMUNICATION SYSTEM AND RADIO RESOURCES ASSIGNING METHOD FOR THE SYSTEM, AND BASE STATION

INCORPORATION BY REFERENCE

This application is based upon and claims the benefit of priority from Japanese patent applications No. 2006-350805, filed on Dec. 27, 2006, the disclosure of which is incorporated herein its entirety by reference.

BACKGROUND OF THE INVENTION

1. Field of the Invention

The present invention relates to a mobile communication system and a radio resources assigning method for the system, and a base station, and more specifically to a mobile communication system and a radio resources assigning method for the system, and a base station that divide a transmission frequency band into a plurality of frequency blocks (RBs: frequency blocks), and assigns (schedules) radio resources to each mobile station for each RB.

2. Description of the Related Art

If the frequency band used in a radio transmission is relatively narrowband, it is assumed that the reception level in the band is constant. However, if it is broadband, the frequency dependency at a reception level is outstanding, and it is not appropriate to approximate it by a constant value.

Therefore, this type of mobile communication system uses a radio resources assigning method in which the transmission frequency band is divided into a plurality of frequency blocks (RBs), and the radio resources are assigned to each mobile station for each RB.

FIG. 6 shows the configuration of an example of the related mobile communication system. In FIG. 6, an example of the related mobile communication system includes an upper layer 101, a base station 102, one or more mobile stations 103-1 to 103-n (n is a positive integer).

The base station 102 includes a scheduler 111, a data channel decoding portion 112, a control channel decoding portion 113, a control channel generation portion 114, a data channel generation portion 115, a pilot channel generation portion 116, a demodulation portion 117, a channel estimation portion 118, a modulation portion 119, a radio portion 120, and an antenna 121.

The mobile stations 103-1 to 103-n respectively include antennas 131-1 to 131-n.

The data channel generation portion 115 of the base station 102 converts data 201 transmitted from the upper layer 101 into a data format matching the radio channel, error-correction-codes the data, and transmits it to the modulation portion 119. The conversion includes the process of converting data into a radio frame size or a multiple of the size.

The control channel generation portion 114 receives control channel information (modulation system of a data channel, parameter relating to a coding rate, occupied RB number, etc.), error-correction-codes the data, converts the data into the data format of the control channel, and outputs the resultant data as data 203 to the modulation portion 119.

The pilot channel generation portion 116 generates a pilot pattern 204 and outputs it to the modulation portion 119.

The modulation portion 119 assigns the data 203 of the control channel, data channel transmission data 202, pilot channel transmission data 204 to each RB in the transmission signal based on the RB assignment information 205 from the scheduler 111, forms a transmission signal 206, and outputs it to the radio portion 120. The formation of the transmission signal 206 includes the process of modulating and spreading each data.

The radio portion 120 has the function of converting the transmission signal 206 into a signal of the RF band, and outputting the signal as a transmission signal 207 to the antenna 121, and the function of converting the received signal of the antenna 121 into a baseband signal 208 and outputting it to the demodulation portion 117. The signal 207 represents both a transmission signal and a received signal of the RF band.

The channel estimation portion 118 obtains a channel estimation value by the despreading process from the received signal 208, and outputs it as data 209 to the demodulation portion 117.

The demodulation portion 117 demodulates the data of the data channel from the received signal 208 based on the data 209 indicating the channel estimation value and data 210 indicating a control channel decoding result, and generates a soft determination value 211.

The demodulating function includes the despreading and the demodulation calculation on the received data. The demodulation portion 117 demodulates the control channel data from the received signal 208 based on the data 209 indicating the channel estimation value, and calculates a soft determination value 212.

The data channel decoding portion 112 has the function of error-correction-decoding the soft determination value 211 of the data channel. Decoded data 213 is output to the upper layer 101.

The control channel decoding portion 113 error-correction-decodes the soft determination value 212 of the control channel, and outputs the result as data 214 to the scheduler 111.

On the other hand, disclosed is a radio transmission system for measuring the reception quality (signal to interference ratio: SIR) for each radio frame, measuring the amount of the fluctuation of the reception quality from the measurement value, and selecting the modulation mode depending on the amount of the fluctuation of the reception quality (for example, refer to the patent document 1 (Japanese Patent Laid-Open No. 2005-136773 (paragraphs 0006, 0011, 0012, 0016, and FIG. 2)).

Furthermore disclosed is the invention relating to the frequency scheduling for dividing the entire frequency band assigned to the system into a plurality of frequency blocks and assigning radio resources for each divided frequency block (for example, refer to the patent documents 2 and 3 (Japanese Patent Laid-Open No. 2006-050545 (paragraphs 0004, 0015, 0069, and FIG. 2), and Japanese Patent Laid-Open No. 2006-237897 (paragraphs 0002 to 0004, 0014, 0114, and FIG. 3)).

Additionally disclosed is a radio communication device for dividing blocks depending on the size of the SIR and determining the appropriate modulation system depending on the SIR for each frequency block (for example, refer to the patent document 4 (Japanese Patent Laid-Open No. 2006-287758 (paragraphs 0003, 0022 to 0024, and FIG. 2)).

However, in this type of related mobile communication system, when a base station determines the assignment of resources to an RB, the fluctuation in the time direction of the SIR of the mobile station is not taken into account, but the measurement value or the average value of the SIR is considered. Therefore, in the propagation environment in which there arises a sharp drop in the SIR such as fading, the resources cannot necessarily be assigned to optimize the entire throughput.

That is, in this type of related mobile communication system, when it is determined (scheduled) to which RB the data of each mobile station is assigned, the determination is based on the downlink SIR that is received by each mobile station or the average value of it.

Each mobile station has the function of calculating the SIR (or a plurality of RBs are grouped, and one SIR is assigned to each group) for all RBs in the system available bands, and notifies the base station of the calculation result through the uplink control channel.

FIG. 7 is a graph showing an example of the relationship between the related frequency block (RB) and the SIR average value. FIG. 8 is a graph showing an example of the relationship between the time and the frequency of the related frequency block (RB).

For example, as shown in FIG. 7, when the SIR in the mobile station 1 is relatively high in the RB 0 and the RB 1, and the SIR in the mobile station 2 is relatively high in the RB 2 and the RB 3, the data addressed to the mobile stations 1 and 2 is respectively assigned to the RB 0 and 1, and the RB 2 and 3 so that the optimum throughput of the entire system can be obtained. As a result, as for the format of the radio frame, the data addressed to the mobile stations 1 and 2 assigned to the RB 0 to 3 as shown in FIG. 8 is simultaneously transmitted.

However, in the fading environment, the entire throughput cannot be necessarily optimum by assigning the RB only based on the average SIR. Because the SIR exhibits a sharp drop in the fading environment, there is such data that cannot be corrected by an error correction code, thereby reducing the throughput. But even in such a case, there can be low SIR degradation in average SIR value if a relatively long time period can be reserved with a preferable SIR.

That is, as disclosed by the related technology, if only an average SIR of each mobile station is counted, the occurrence of a decoding error in a mobile station by a sudden drop in the SIR caused by fading, that is, the reduction of throughput, cannot be easily reflected when an RB is assigned.

Any of the above-mentioned patent documents 1 to 4 does not disclose effective means to solve the problems above.

SUMMARY

An exemplary object of the invention is to provide a mobile communication system and a radio resources assigning method for the system, and a base station capable of assigning the resources to optimize the entire throughput for the propagation environment in which a sharp drop in the SIR such as fading occurs.

An exemplary aspect of the invention is a mobile communication system that includes a base station that divides a transmission frequency band into a plurality of frequency blocks, and assigns radio resources to each mobile station for each of the frequency blocks. The base station includes: a frequency block assignment information creation portion that creates frequency block assignment information based on a downlink signal reception status and a downlink signal reception status degradation rate in each mobile station; and a radio resource assignment portion that assigns the radio resources to each frequency block based on the frequency block assignment information.

An exemplary aspect of the invention is a radio resources assigning method in a mobile communication system that includes a base station that divides a transmission frequency band into a plurality of frequency blocks, and assigns radio resources to each mobile station for each of the frequency blocks. The base station includes: creating frequency block assignment information based on a downlink signal reception status and a downlink signal reception status degradation rate in each mobile station; and assigning the radio resources to each frequency block based on the frequency block assignment information.

An exemplary aspect of the invention is a base station that divides a transmission frequency band into a plurality of frequency blocks, and assigns radio resources to each mobile station for each of the frequency blocks. The base station includes: a frequency block assignment information creation portion that creates frequency block assignment information based on a downlink signal reception status and a downlink signal reception status degradation rate in each mobile station; and a radio resource assignment portion that assigns the radio resources to each frequency block based on the frequency block assignment information.

An exemplary aspect of the invention is a recording medium storing a program for a radio resources assigning method in a mobile communication system that includes a base station which divides a transmission frequency band into a plurality of frequency blocks, and assigns radio resources to each mobile station for each frequency block. The program is provided in the base station and used to direct a computer to perform a process including: creating frequency block assignment information based on a downlink signal reception status and a downlink signal reception status degradation rate in each mobile station; and assigning the radio resources to each frequency block based on the frequency block assignment information.

EXEMPLARY EMBODIMENT

The operation of the present invention is described below. The present invention can improve the throughput by considering the degradation status due to the fading of the downlink signal reception status (for example, SIR) in each mobile station when radio resources are assigned.

The scheduler according to the present invention determines the assignment of the downlink data for each mobile station to the RB. As a parameter used in determining the assignment, an average value SIR that has relatively been used is used, and an SIR degradation rate is used with the occurrence status of sudden degradation of the SIR by the fading taken into account according to the present invention.

The SIR degradation rate is a rate of the number of radio frames in which an SIR is lower than an SIR threshold in a time period for summation when a drop in the SIR is compared with an SIR threshold. The SIR threshold is set as an SIR value with which an uncorrectable error occurs when an error correction code is decoded.

For each mobile station, an SIR degradation rate is obtained at each RB. The obtained rate is introduced to the parameter when radio resources are assigned. Thereby more correctly estimating, than in the related method, the improvement of the entire throughput by determining to which RB the data addressed to each mobile station is to be assigned.

Figure 1:
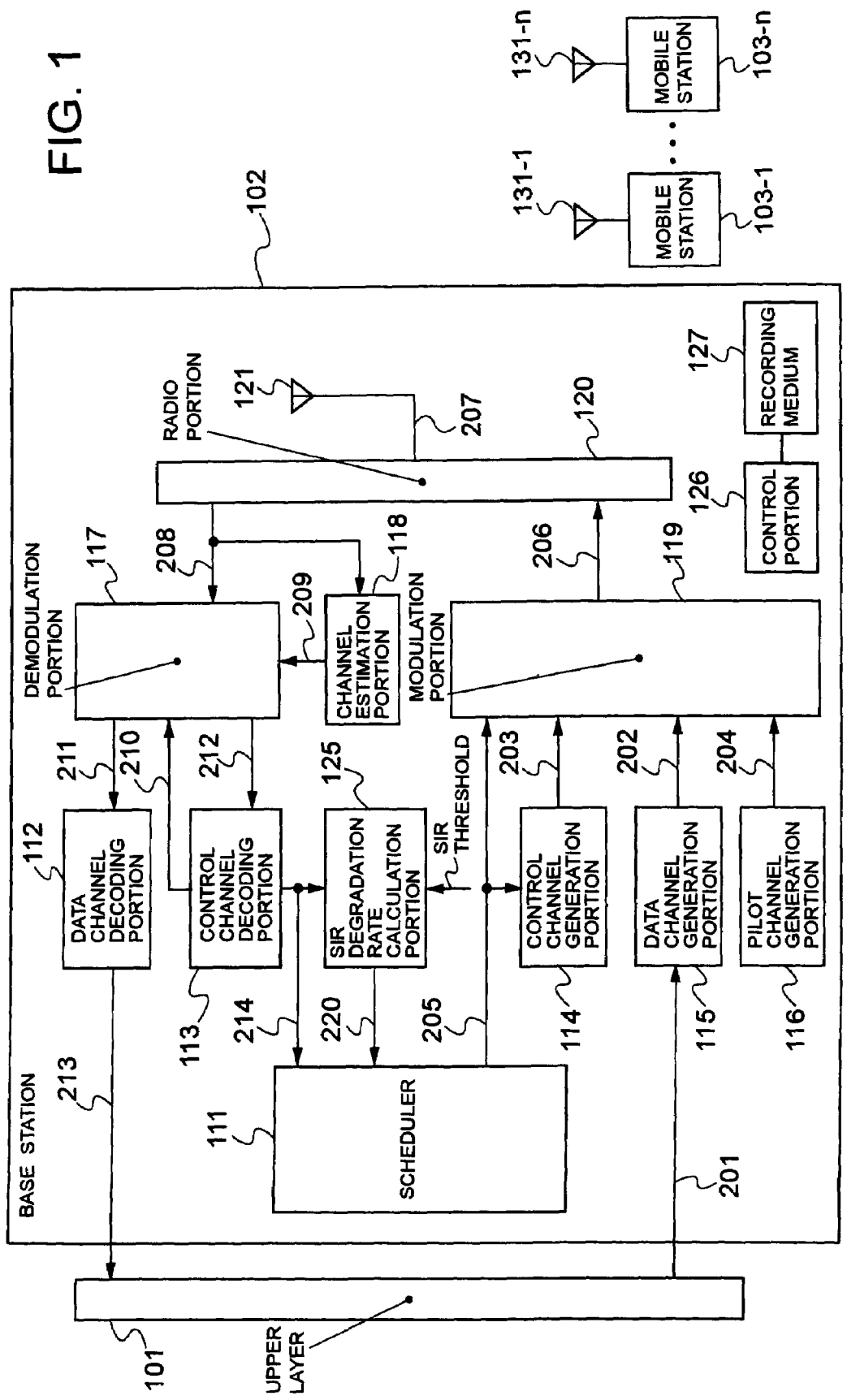
FIG. 1 shows the configuration of an exemplary embodiment of the mobile communication system according to the present invention.
Figure 6:
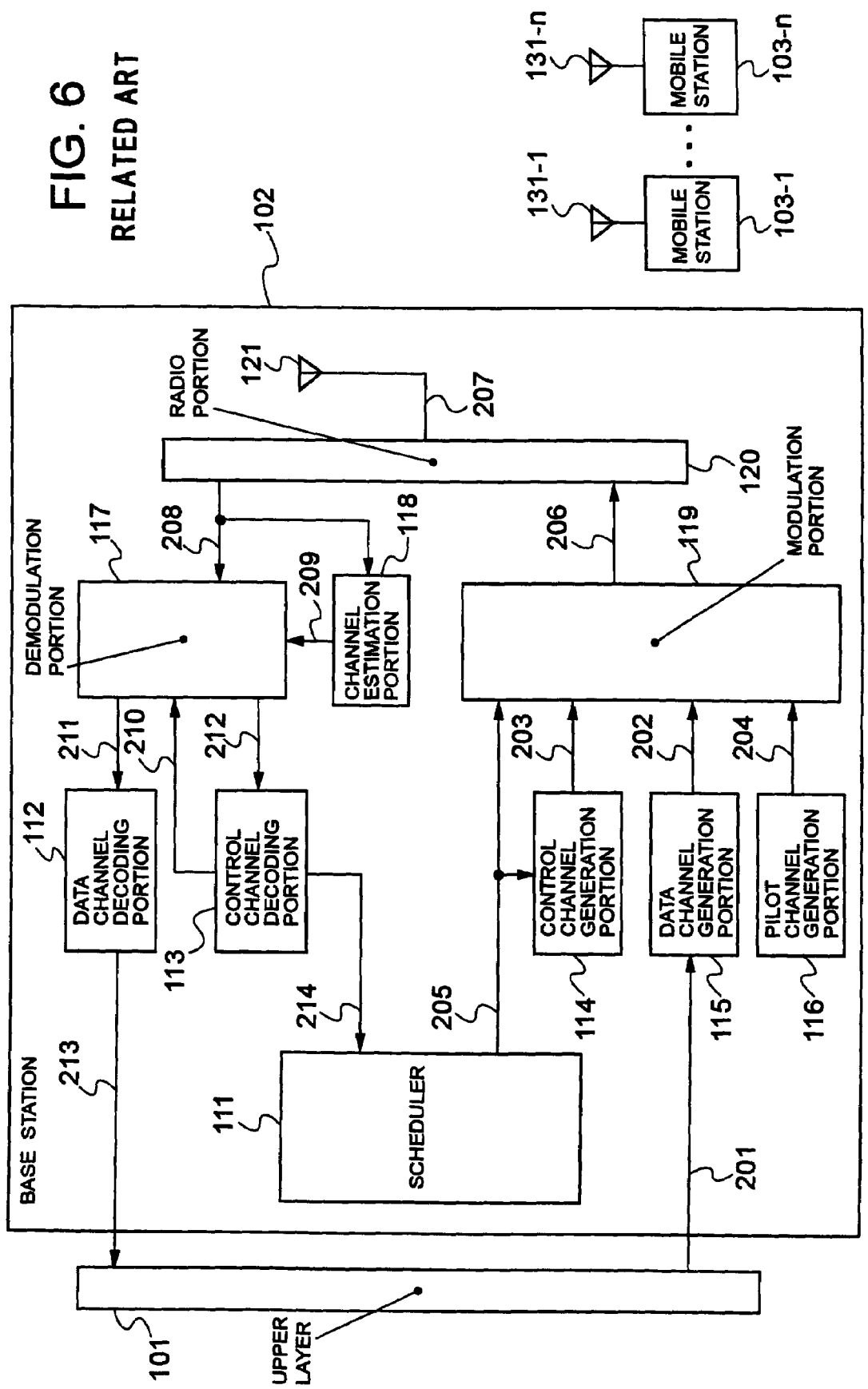
FIG. 6 shows the configuration of an example of the related mobile communication system.
Figure 7:
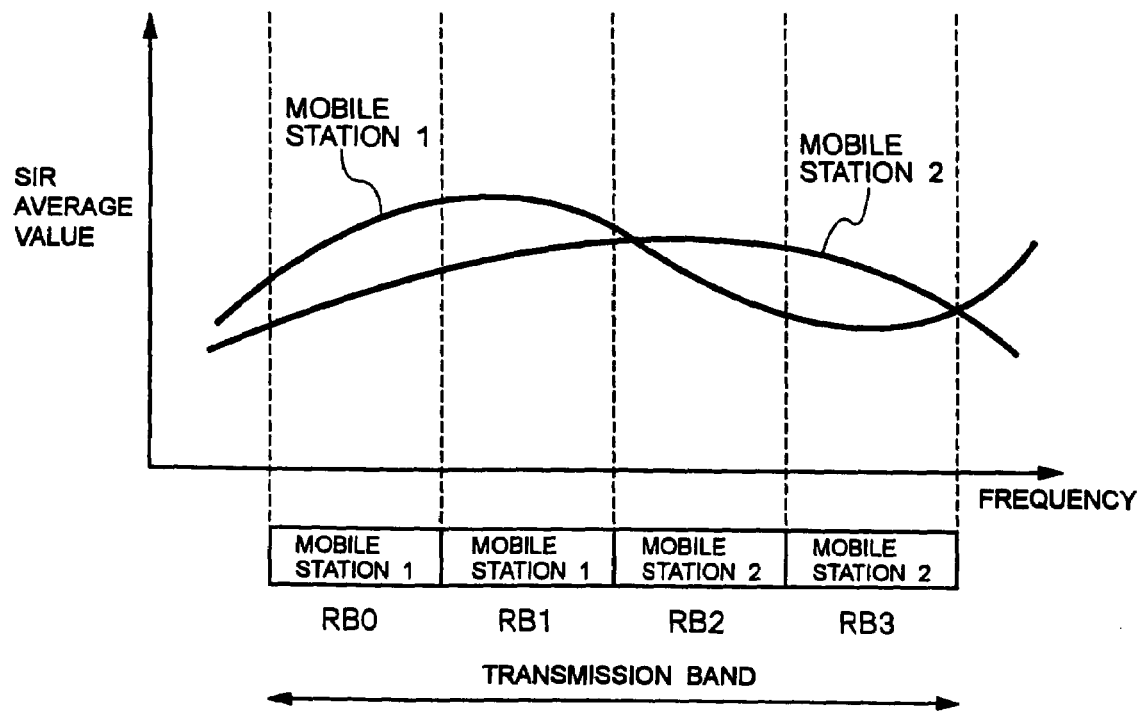
FIG. 7 is a graph showing an example of the relationship between the related frequency block (RB) and the SIR average value.
Figure 8:
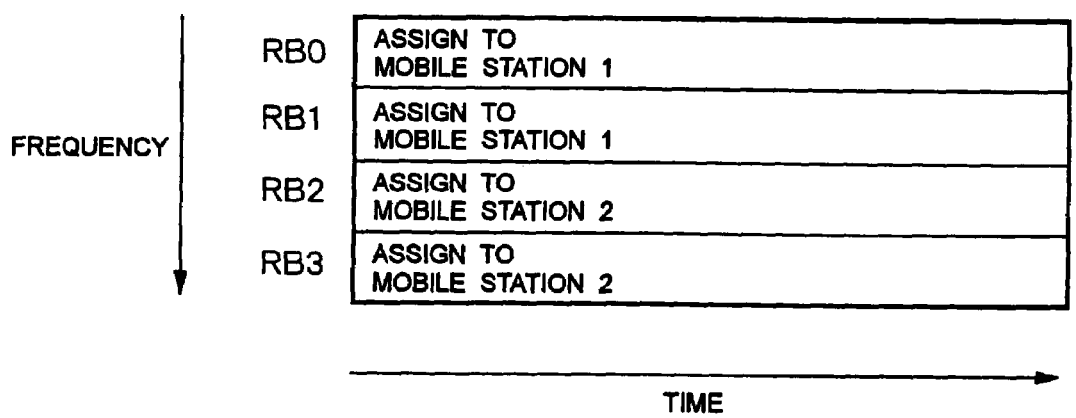
FIG. 8 is a graph showing an example of the relationship between the time and the frequency of the related frequency block (RB).

The exemplary embodiment of the present invention is described below with reference to the attached drawings. FIG. 1 shows the configuration of an exemplary embodiment of the mobile communication system according to the present invention. The same component as shown in FIG. 6 is assigned the same reference numeral. The difference of the mobile communication system according to the present invention from the related system shown in FIG. 6 is that the present system includes an SIR degradation rate calculation portion 125 and a control portion 126, and a recording medium 127.

In FIG. 1, an exemplary embodiment of the mobile communication system according to the present invention includes the upper layer 101, the base station 102, and one or more mobile stations 103-1 to 103-n (n is a positive integer).

The base station 102 includes the scheduler 111, the data channel decoding portion 112, the control channel decoding portion 113, the SIR degradation rate calculation portion 125, the control channel generation portion 114, the data channel generation portion 115, the pilot channel generation portion 116, the demodulation portion 117, the channel estimation portion 118, the modulation portion 119, the radio portion 120, the antenna 121, the control portion 126, and the recording medium 127.

The mobile stations 103-1 to 103-n respectively include the antennas 131-1 to 131-n.

The radio portion 120 has the function of converting the received signal of the RF band received through the antenna 121 into the received signal 208 in the baseband, and the function of converting the transmission signal 206 in the baseband into a transmission signal in the RF band.

The channel estimation portion 118 obtains a channel estimation value in the despreading process from the received signal 208, and outputs the channel estimation value as the data 209 to the demodulation portion 117.

The demodulation portion 117 demodulates the data of the data channel from the received signal 208 based on the data 209 indicating the channel estimation value and the data 210 indicating a result of decoding a control channel, and generates the soft determination value 211. The demodulating function includes the despreading process on the received data and the calculation of demodulating a complex signal to soft determination data. The demodulation portion 117 also demodulates the control channel data from the received signal 208 based on the data 209 indicating a channel estimation value, and calculates the soft determination value 212.

The data channel decoding portion 112 error-correction-decodes the soft determination value 211 of a data channel. The decoded data 213 is output to the upper layer 101.

The control channel decoding portion 113 error-correction-decodes the soft determination value 212 of a control channel. In the decoding result, the data 210 indicating the radio parameter (modulation system etc.) is transmitted to the demodulation portion 117, and the demodulation portion 117 demodulates the data channel using the radio parameter.

The control channel decoding portion 113 extracts the SIR of each mobile station mapped on the control channel, and transmits the SIR to both of the scheduler 111 and the SIR degradation rate calculation portion 125.

The SIR degradation rate calculation portion 125 receives an SIR and an SIR threshold, and sums the number of times of the SIR of each radio frame falling below the SIR threshold for the closest radio frame to the radio frame a constant number preceding the closest radio frame.

Figure 2:
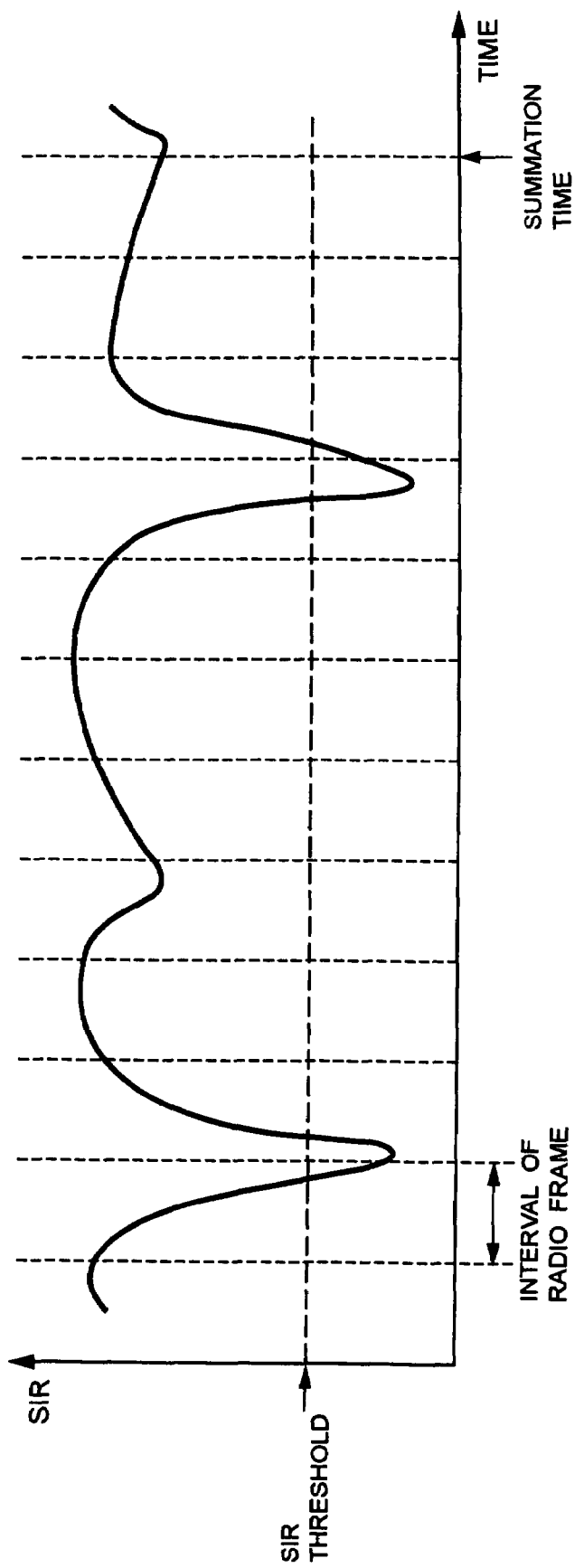
FIG. 2 is a graph showing an example of the relationship between the SIR and the time of a received signal.

FIG. 2 is a graph showing an example of the relationship between the SIR and the time of the received signal. In FIG. 2, for example, in the summation range from the summation time back to the 12th radio frame, the SIR twice falls below the SIR threshold. Therefore, the SIR degradation rate is 2/12=0.17. In the range of the summation, a value of 1 or more (in units of radio frames) can be optionally set. For example, the same value for the radio frame as a calculation target of an average SIR can be set.

Back in FIG. 1, the scheduler 111 inputs an SIR 214 of each mobile station and an SIR degradation rate 220, determines to which RB the data to each mobile station is assigned based on the SIR 214 of each mobile station and the SIR degradation rate 220, and notifies the modulation portion 119 of the determination results by the RB assignment information 205.

The data channel generation portion 115 converts the data 201 from the upper layer 101 into the data format matching the radio channel, error-correction-codes the result, and transmits it as the data 202 to the modulation portion 119. The conversion includes the conversion into a radio frame size or a multiple of the size.

The control channel generation portion 114 receives from the scheduler 111 the control channel information (data channel modulation system, parameter relating to the coding rate, occupied RB number, etc.), error-correction-codes it, converts it into the data format of the control channel, and outputs the result as the data 203 to the modulation portion 119.

The pilot channel generation portion 116 generates the pilot pattern 204 and outputs it to the modulation portion 119.

The modulation portion 119 assigns the data 203 of the control channel, the data 202 of the data channel, the data 204 of the pilot channel to each RB in the transmission signal based on the RB assignment information 205 from the scheduler 111, forms the transmission signal 206, and outputs the result to the radio portion 120. The formation of the transmission signal 206 includes the process of modulating and spreading each data.

The transmission signal 206 is converted into an RF band signal 207 by the radio portion 120, and transmitted through the antenna 121.

The RF band signal 207 is received by each of the mobile stations 103-1 to 103-n, and then demodulated and decoded. The exemplary embodiment of the present invention for each of the mobile stations 103-1 to 103-n is similar to the related method. That is, each of the mobile stations 103-1 to 103-n calculates an SIR for each radio frame from an average value and dispersion of the despreading result of the downlink pilot channel. Next, each of the mobile stations 103-1 to 103-n notifies the base station 102 of the SIR through the uplink control channel for each radio frame.

Figure 3:
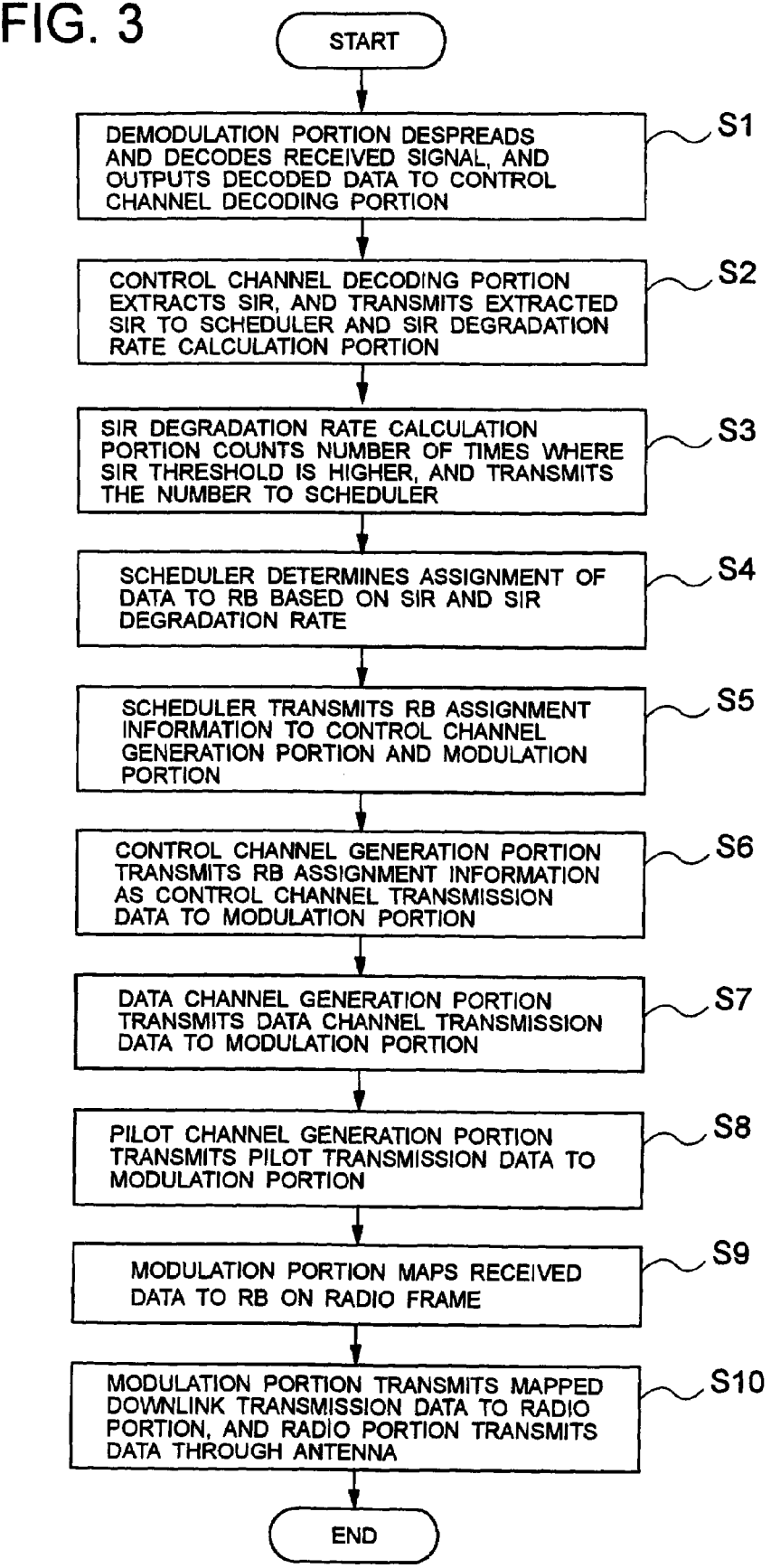
FIG. 3 is a flowchart of the operation of an exemplary embodiment of the mobile communication system according to the present invention.

Next, the operation of an exemplary embodiment of the mobile communication system according to the present invention is described below in detail with reference to FIGS. 1 and 3. FIG. 3 is a flowchart of the operation of an exemplary embodiment of the mobile communication system according to the present invention. The recording medium 127 stores a program for the radio resources assigning method shown by the flowchart in FIGS. 3 and 5. The control portion 126 reads the program from the recording medium 127, and controls the portions 111 to 120, and 125 according to the program.

When the received signal 208 is input to the demodulation portion 117, the demodulation portion 117 despreads and decodes the received signal 208, and outputs the result as a signal 212 to the control channel decoding portion 113 (step S1 shown in FIG. 3).

The control channel decoding portion 113 error-correction-decodes the uplink control channel data, extracts an SIR in each of the mobile stations 103-1 to 103-n from data of the decoding result, and transmits the data 214 to the SIR degradation rate calculation portion 125 and the scheduler 111 (step S2 shown in FIG. 3).

The SIR degradation rate calculation portion 125 counts "the number of times the data 214 indicating an SIR falls below the SIR threshold in the summation period of the SIR degradation rate" for each of the mobile stations 103-1 to 103-n, calculates the rate lower than SIR threshold from the count result, and transmits the calculation result to the scheduler 111 (step S3 shown in FIG. 3).

The scheduler 111 determines the assignment of data addressed to each of the mobile stations 103-1 to 103-n to an RB based on the SIR and the SIR degradation rate for each of the mobile stations 103-1 to 103-n (step S4 shown in FIG. 3).

Figure 4:
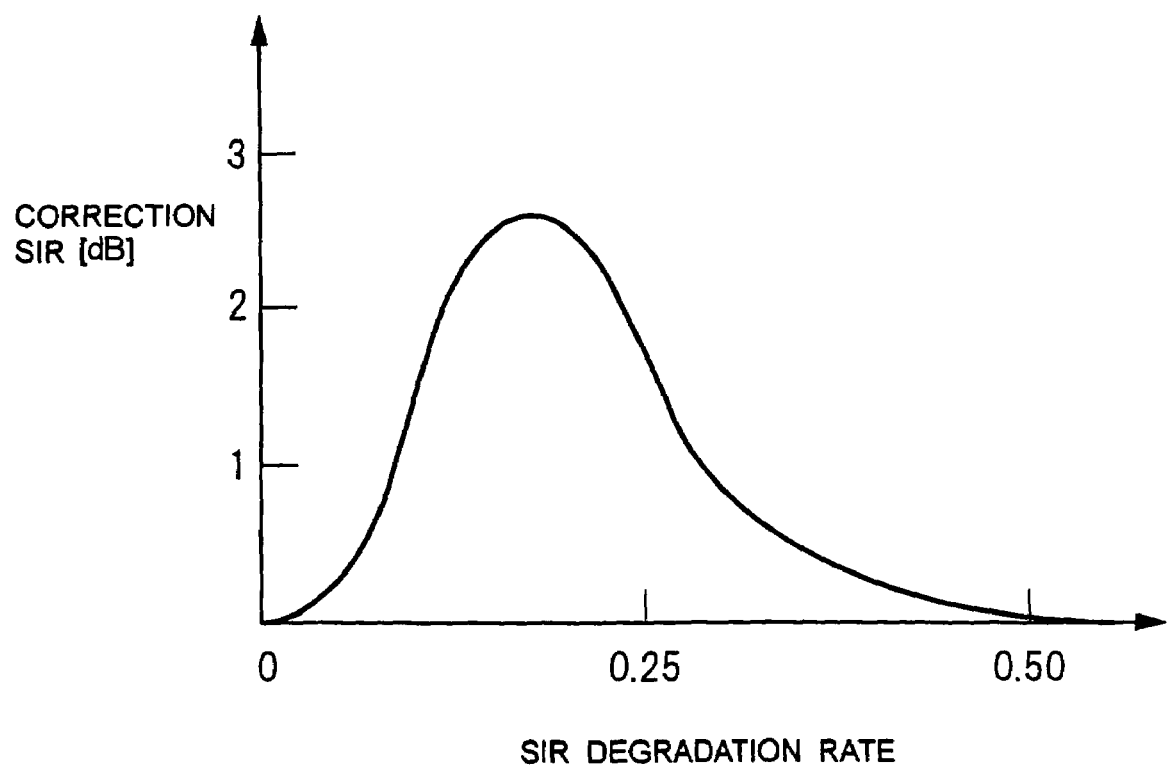
FIG. 4 is a graph showing an example of the relationship between the correction SIR and the SIR degradation rate.
Figure 5:
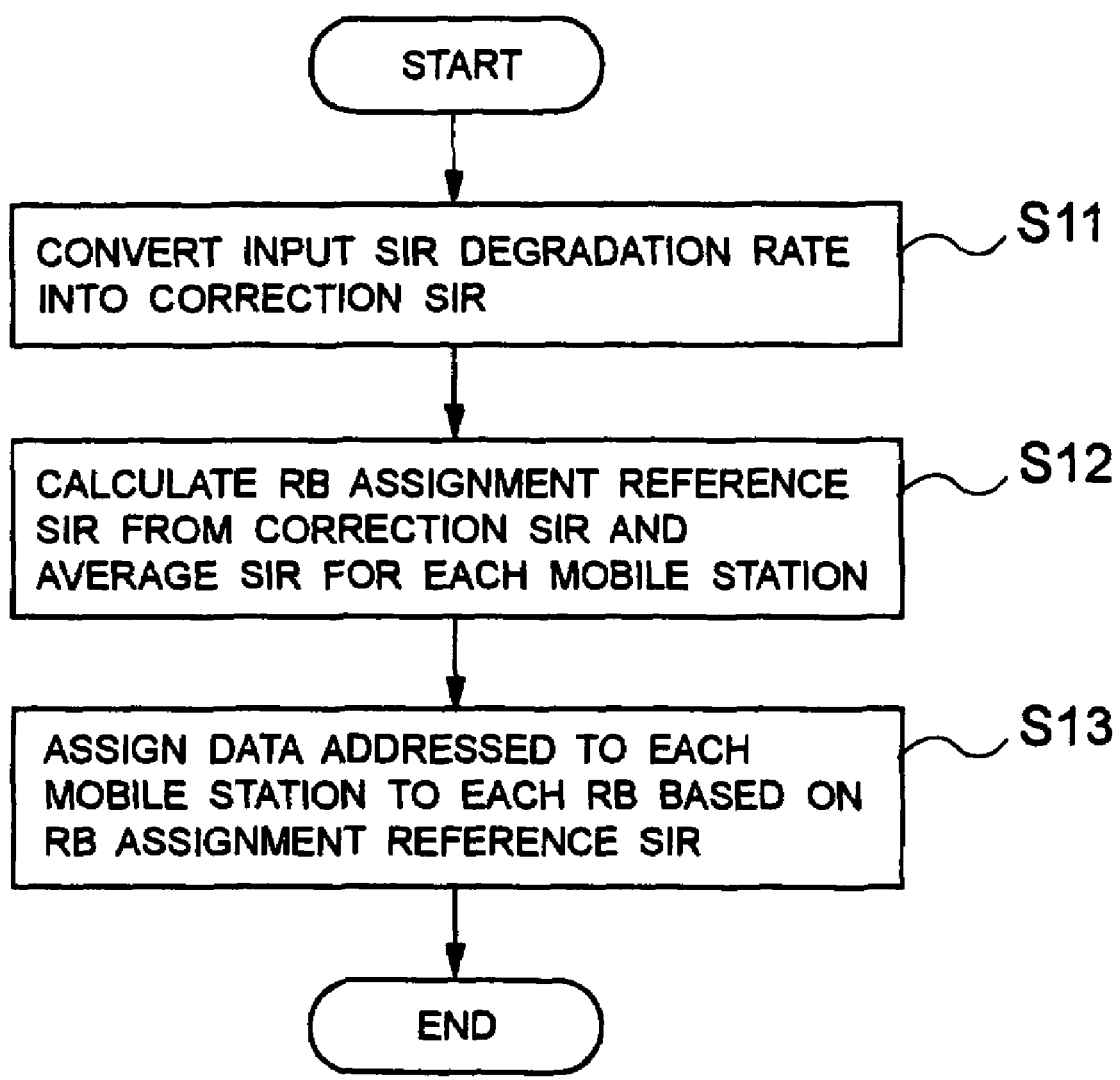
FIG. 5 is a flowchart showing an exemplary embodiment of the radio resources assigning method.

Next, the radio resources assigning method in the scheduler 111 is described below. FIG. 4 is a graph showing an example of the relationship between the correction SIR and the SIR degradation rate. FIG. 5 is a flowchart showing an exemplary embodiment of the radio resources assigning method.

The scheduler 111 holds the relational expression (defined as equation 1) between the SIR degradation rate and the correction SIR shown in FIG. 4. The input SIR degradation rate is converted into a correction SIR using the equation 1 for each of the mobile stations 103-1 to 103-n (step S11 shown in FIG. 5).

The correction SIR indicates the correspondence to the degradation of the throughput when the SIR degradation rate is converted in to an average SIR. Any converting method can be used so far as the relationship between the SIR degradation rate and the correction SIR can be uniquely defined, for example, by defining a function, using a conversion table, etc.

As shown in FIG. 4, the correction SIR is "0" when the SIR degradation rate is about "0" or exceeds "0.5" and a drop in SIR frequently occurs. On the other hand, when the SIR degradation rate is relatively low, the drop in SIR is hardly reflected on an average SIR. Therefore, the correction SIR becomes relatively high.

Next, the scheduler 111 calculates the RB assignment reference SIR from the correction SIR 220 and the average SIR 214 for each of the mobile stations 103-1 to 103-n (step S12 shown in FIG. 5).

The calculation is performed by the equation 2.

$$RB\text{ assignment reference }SIR = \text{average }SIR - \text{correction }SIR \quad \text{(equation 2)}$$

Next, the scheduler 111 finally assigns to each RB the data addressed to each of the mobile stations 103-1 to 103-n based on the RB assignment reference SIR (step S13 shown in FIG. 5).

That is, the data addressed to each mobile station is assigned to an RB having a larger RB assignment reference SIR for each of the mobile stations 103-1 to 103-n.

Back in the flowchart shown in FIG. 3, the scheduler 111 transmits the RB assignment information 205 for each of the mobile stations 103-1 to 103-n to the control channel generation portion 114 and the modulation portion 119 (step S5 shown in FIG. 3).

The control channel generation portion 114 stores the RB assignment information 205 in the transmission format of the downlink control channel, and transmits it as the control channel transmission data 203 to the modulation portion 119 (step S6 shown in FIG. 3).

The data channel generation portion 115 transmits the data channel transmission data 202 to the modulation portion 119 (step S7 shown in FIG. 3).

The data channel transmission data 202 is transmitted as the transmission data 201 addressed to each of the mobile stations 103-1 to 103-n from the upper layer 101 to the data channel generation portion 115, and error-correction-coded by the data channel generation portion 115.

The pilot channel generation portion 116 transmits the pilot transmission data 204 to the modulation portion 119 (step S8 shown in FIG. 3).

The order of the processes in steps S6 to S8 is voluntarily determined, and the processes can also be simultaneously performed.

Then, the modulation portion 119 maps the control channel transmission data 203, the data channel transmission data 203, the pilot channel transmission data 204 to the RB on the radio frame (step S9 shown in FIG. 3).

In this process, the mapping is performed depending on the RB assignment information 205 at least for the data channel so that the throughput to all downlink mobile stations can be optimized.

Next, the modulation portion 119 transmits the mapped downlink transmission data 206 to the radio portion 120. Upon receipt of the downlink transmission data 206, the radio portion 120 transmits the data 207 through the antenna 121 (step S10 shown in FIG. 3).

An exemplary advantage according to the invention is that an occurrence rate (SIR degradation rate) of a sharp drop in SIR in the fading environment is introduced as an index when the RB assignment of transmission data addressed to each mobile station is determined. Therefore, the relationship between the realized throughput in each RB and the SIR can be estimated with high accuracy and the throughput to the entire mobile stations can be enhanced as compared with the related case in which only an average SIR is considered as an index.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A mobile communication system including a base station which divides a transmission frequency band into a plurality of frequency blocks, and assigns radio resources to each mobile station of a plurality of mobile stations for each of the plurality of frequency blocks, the base station comprising:
   a frequency block assignment information creation portion that creates frequency block assignment information based on a downlink signal reception status and a downlink signal reception status degradation rate in each mobile station of the plurality of mobile stations; and
   a radio resource assignment portion that assigns the radio resources to each frequency block based on the frequency block assignment information, wherein the downlink signal reception status degradation rate comprises a value obtained by dividing a frequency of reception status lower than a predetermined threshold in downlink signal reception status in each of a predetermined number of radio frames by a number of radio frames.

2. The mobile communication system according to claim 1, wherein the frequency block assignment information creation portion holds a relational expression for conversion of the downlink signal reception status degradation rate into a correction value of the downlink signal reception status.

3. The mobile communication system according to claim 2, wherein a value of downlink signal reception status as a reference of frequency block assignment is obtained by subtracting a correction value of the downlink signal reception status from an average value of downlink signal reception status in a predetermined number of radio frames.

4. A radio resources assigning method in a mobile communication system including a base station which divides a transmission frequency band into a plurality of frequency blocks, and assigns radio resources to each mobile station for each of the frequency blocks, the method comprising:
creating frequency block assignment information based on a downlink signal reception status and a downlink signal reception status degradation rate in each mobile station; and
assigning the radio resources to each frequency block based on the frequency block assignment information,
wherein the downlink signal reception status degradation rate comprises a value obtained by dividing a frequency of reception status lower than a predetermined threshold in downlink signal reception status in each of a predetermined number of radio frames by a number of radio frames.

5. The radio resources assigning method according to claim 4, wherein the frequency block assignment information is created based on a relational expression for conversion of the downlink signal reception status degradation rate into a correction value of the downlink signal reception status.

6. The radio resources assigning method according to claim 5, wherein a value of downlink signal reception status as a reference of frequency block assignment is obtained by subtracting a correction value of the downlink signal reception status from an average value of downlink signal reception status in a predetermined number of radio frames.

7. A base station which divides a transmission frequency band into a plurality of frequency blocks, and assigns radio resources to each mobile station for each of the frequency blocks, comprising:
a frequency block assignment information creation portion that creates frequency block assignment information based on a downlink signal reception status and a downlink signal reception status degradation rate in each mobile station; and
a radio resource assignment portion that assigns the radio resources to each frequency block based on the frequency block assignment information,
wherein the downlink signal reception status degradation rate comprises a value obtained by dividing a frequency of reception status lower than a predetermined threshold in downlink signal reception status in each of a predetermined number of radio frames by a number of radio frames.

8. The base station according to claim 7, wherein the frequency block assignment information creation portion holds a relational expression for conversion of the downlink signal reception status degradation rate into a correction value of the downlink signal reception status.

9. The base station according to claim 8, wherein a value of downlink signal reception status as a reference of frequency block assignment is obtained by subtracting a correction value of the downlink signal reception status from an average value of downlink signal reception status in a predetermined number of radio frames.

10. A non-transitory recording storage medium tangibly storing a program for a radio resources assigning method in a mobile communication system including a base station which divides a transmission frequency band into a plurality of frequency blocks, and assigns radio resources to each mobile station of a plurality of mobile stations for each of the frequency blocks, the program provided in the base station and used to direct a computer to perform a method, comprising:
creating frequency block assignment information based on a downlink signal reception status and a downlink signal reception status degradation rate in each mobile station of the plurality of mobile stations; and
assigning the radio resources to each frequency block based on the frequency block assignment information,
wherein the downlink signal reception status degradation rate comprises a value obtained by dividing a frequency of reception status lower than a predetermined threshold in downlink signal reception status in each of a predetermined number of radio frames by a number of radio frames.

11. A mobile communication system including a base station which divides a transmission frequency band into a plurality of frequency blocks, and assigns radio resources to each mobile station of the plurality of mobile stations for each of the frequency blocks, the base station comprising:
a frequency block assignment information creation means for creating frequency block assignment information based on a downlink signal reception status and a downlink signal reception status degradation rate in each mobile station; and
a radio resource assignment means for assigning the radio resources to each frequency block based on the frequency block assignment information,
wherein the downlink signal reception status degradation rate comprises a value obtained by dividing a frequency of reception status lower than a predetermined threshold in downlink signal reception status in each of a predetermined number of radio frames by a number of radio frames.

12. A base station which divides a transmission frequency band into a plurality of frequency blocks, and assigns radio resources to each mobile station for each frequency block, comprising:
a frequency block assignment information creation means for creating frequency block assignment information based on a downlink signal reception status and a downlink signal reception status degradation rate in each mobile station; and
a radio resource assignment means for assigning the radio resources to each frequency block based on the frequency block assignment information,
wherein the downlink signal reception status degradation rate comprises a value obtained by dividing a frequency of reception status lower than a predetermined threshold in downlink signal reception status in each of a predetermined number of radio frames by a number of radio frames.

13. A mobile communication system including a base station which divides a transmission frequency band into a plurality of frequency blocks, and assigns radio resources to each mobile station of a plurality of mobile stations for each of the plurality of frequency blocks, the base station comprising:
- a frequency block assignment information creation portion that creates frequency block assignment information based on a downlink signal reception status and a downlink signal reception status degradation rate in each mobile station of the plurality of mobile stations: and
- a radio resource assignment portion that assigns the radio resources to each frequency block based on the frequency block assignment information,
- wherein the downlink signal reception status degradation rate comprises a number of times data indicating a downlink signal reception status falls below a downlink signal reception status threshold in a summation period of the downlink signal reception status degradation rate.

14. A mobile communication system including a base station which divides a transmission frequency band into a plurality of frequency blocks, and assigns radio resources to each mobile station of a plurality of mobile stations for each of the plurality of frequency blocks, the base station comprising:
- a frequency block assignment information creation portion that creates frequency block assignment information based on a downlink signal reception status and a downlink signal reception status degradation rate in each mobile station of the plurality of mobile stations; and
- a radio resource assignment portion that assigns the radio resources to each frequency block based on the frequency block assignment information; and
- a downlink signal reception status degradation rate calculation portion configured to sum a number of times a respective downlink signal reception status of each radio frame falling below a downlink signal reception status threshold for a closest radio frame to a radio frame a constant number preceding the closest radio frame.

15. The mobile communication system according to claim 14, further comprising a scheduler portion configured to determine an assignment of data to a radio frame based on the downlink signal reception status and the downlink signal reception status degradation rate.

* * * * *